(12) United States Patent
Hoque et al.

(10) Patent No.: US 12,530,593 B2
(45) Date of Patent: Jan. 20, 2026

(54) METHODS FOR LONG-RANGE FEDERATED EDGE LEARNING WITH CHIRP-BASED OVER-THE-AIR COMPUTATION

(71) Applicant: UNIVERSITY OF SOUTH CAROLINA, Columbia, SC (US)

(72) Inventors: Safi Shams Muhtasimul Hoque, West Columbia, SC (US); Alphan Sahin, Columbia, SC (US)

(73) Assignee: UNIVERSITY OF SOUTH CAROLINA, Columbia, SC (US)

( * ) Notice: Subject to any disclaimer, the term of this patent is extended or adjusted under 35 U.S.C. 154(b) by 662 days.

(21) Appl. No.: 18/083,697

(22) Filed: Dec. 19, 2022

(65) Prior Publication Data

US 2023/0214667 A1 Jul. 6, 2023

Related U.S. Application Data

(60) Provisional application No. 63/296,991, filed on Jan. 6, 2022.

(51) Int. Cl.
*G06N 3/098* (2023.01)
(52) U.S. Cl.
CPC .................. *G06N 3/098* (2023.01)
(58) Field of Classification Search
CPC ...... G06N 3/098; G06N 3/0464; G06N 3/084; H04B 17/3913; H04W 52/283; H04W 52/367
See application file for complete search history.

(56) References Cited

U.S. PATENT DOCUMENTS

| 2012/0307871 A1* | 12/2012 | Schaffner | H04L 27/0014 375/139 |
| 2014/0198830 A1* | 7/2014 | Sen | H04L 25/0204 375/150 |

(Continued)

OTHER PUBLICATIONS

Amiri et al., Federated Learning Over Wireless Fading Channels, IEEE Transactions on Wireless Communications, vol. 19, Issue 5, 2020, 3546-3557. https://doi.org/10.1109/TWC.2020.2974748.

(Continued)

*Primary Examiner* — Fayyaz Alam
(74) *Attorney, Agent, or Firm* — DORITY & MANNING, P.A.

(57) ABSTRACT

The disclosure deals with a system and method for circularly-shifted chirp (CSC)-based majority vote (MV) (CSC-MV), a low-peak-to-mean envelope power ratio (PMEPR) over-the-air computation (OAC) scheme, to achieve long-range federated edge learning (FEEL). The presently disclosed OAC approach maps the votes (i.e., the sign of the local gradients) from the edge devices (EDs) to linear CSCs constructed with the discrete Fourier transform (DFT)-spread orthogonal frequency division multiplexing (OFDM) (DFT-s-OFDM). At the edge server (ES), the MV was calculated non-coherently with an energy detector. We compare our presently disclosed scheme with one-bit broadband digital aggregation (OBDA) and show that the output-power back-off (OBO) requirement of the transmitters with an adjacent-channel-leakage ratio (ACLR) constraint for the presently disclosed scheme is significantly lower than the one with OBDA. We demonstrate that CSC-MV outperforms OBDA in terms of test accuracy for both homogeneous and heterogeneous data distributions, even when the power control is not ideal.

18 Claims, 5 Drawing Sheets

(56) References Cited

U.S. PATENT DOCUMENTS

| | | | | |
|---|---|---|---|---|
| 2022/0391696 | A1* | 12/2022 | Sahin | H04L 5/001 |
| 2023/0413070 | A1* | 12/2023 | Li | G06N 3/09 |
| 2024/0056240 | A1* | 2/2024 | Sahin | H04L 5/0046 |
| 2024/0064666 | A1* | 2/2024 | Sahin | G06N 3/048 |
| 2024/0236657 | A1* | 7/2024 | Hoque | H04W 12/02 |
| 2024/0388929 | A1* | 11/2024 | Sahin | H04B 7/0626 |
| 2025/0008449 | A1* | 1/2025 | Jeon | H04W 52/243 |
| 2025/0031066 | A1* | 1/2025 | Moosavi | H04L 41/16 |

OTHER PUBLICATIONS

Bernstein et al., signSGD: Compressed Optimisation for Non-Convex Problems, Prodeedings of Machine Learning Research (PLMR), vol. 80, 2018, 560-569. http://proceedings.mlr.press/v80/bernstein18a/bernstein18a.pdf.

Chen et al., Distributed Leaning in Wireless Networks: Recent Progress and Future Challenges, IEEE Journal on Selected Areas in Communications, vol. 39, Issue 12, 2021, 3579-3605. https://doi.org/10.1109/JSAC.2021.3118346.

Gafni et al., Federated Learning: A Signal Processing Perspective, IEEE Signal Processing Magazine, vol. 39, Issue 3, 2022, 14-41. https://doi.org/10.1109/MSP.2021.3125282.

Goldenbaum et al., Harnessing Interference for Analog Function Computation in Wireless Sensor Networks, IEEE Transactions on Signal Processing, vol. 61, Issue 20, 2013, 4893-4906. https://doi.org/10.1109/TSP.2013.2272921.

Hoque et al., A Wideband Index Modulation with Circularly-Shifted Chirps, 2021 IEEE 18th Annual Consumer Communications & Networking Conference (CCNC), 2021, 6 Pages. https://doi.org/10.1109/CCNC49032.2021.9369630.

Liu et al., Over-the-Air Computation Systems: Optimization, Analysis and Scaling Laws, IEEE Transactions on Wireless Communications, vol. 19, Issue 8, 2020, 5488-5502. https://doi.org/10.1109/TWC.2020.2993703.

Nazer et al., Computation Over Multiple-Access Channels, IEEE Transactions on Information Theory, vol. 53, Issue 10, 2007, 3498-3516. https://doi.org/10.1109/TIT.2007.904785.

Sahin et al., Distributed Learning over a Wireless Network with FSK-Based Majority Vote, Conference: 2021 4th International Conference on Advanced Communication Technologies and Networking (CommNet), 2021, 9 Pages. https://arxiv.org/pdf/2111.01850.pdf.

Sahin et al., DFT-Spread-OFDM-Based Chirp Transmission, IEEE Communications Letters, vol. 25, Issue 3, 2020, 902-906. https://doi.org/10.1109/LCOMM.2020.3039222.

Sahin et al., Flexible DFT-S-OFDM: Solutions and Challenges, IEEE Communications Magazine, vol. 54, Issue 11, 2016, 106-112. (Abstract Only) https://doi.org/10.1109/MCOM.2016.1600330CM.

Sahin et al., Over-the-Air Computation with DFT-Spread OFDM for Federated Edge Learning, 2022 IEEE Wireless Communications and Networking Conference (WCNC), 2022, 6 Pages. https://doi.org/10.1109/WCNC51071.2022.9771881.

Zhu et al., Broadband Analog Aggregation for Low-Latency Federated Edge Learning, IEEE Transactions on Wireless Communications, vol. 19, Issue 1, 2020, 491-506. https://doi.org/10.1109/TWC.2019.2946245.

Zhu et al., One-Bit Over-the-Air Aggregation for Communication-Efficient Federated Edge Learning: Design and Convergence Analysis, IEEE Transactions on Wireless Communications, vol. 20, Issue 3, 2021, 2120-2135. https://doi.org/10.1109/TWC.2020.3039309.

* cited by examiner

METHODS FOR LONG-RANGE FEDERATED EDGE LEARNING WITH CHIRP-BASED OVER-THE-AIR COMPUTATION

PRIORITY CLAIM

The present application claims the benefit of priority of U.S. Provisional Patent Application No. 63/296,991, titled Methods for Long-Range Federated Edge Learning with Chirp-Based Over-The-Air Computation, filed Jan. 6, 2022, and which is fully incorporated herein by reference for all purposes.

BACKGROUND OF THE PRESENTLY DISCLOSED SUBJECT MATTER

I. Introduction

Federated edge learning (FEEL) deploys federated learning (FL) over a wireless network, in which many edge devices (EDs) participate in training using locally accessible data and an edge server (ES) aggregates the local decisions without accessing the data at the EDs [1], [2]. With FEEL, the communication load can be a challenge as a significant number of model parameters/gradients/updates need to be exchanged between the ES and the EDs over the wireless channel. The conventional orthogonal multiple access techniques require more spectral resources as the number of EDs grows. Hence, the spectral congestion problem limits the scalability of FEEL. Over-the-air computation (OAC), which takes advantage of the wireless-multiple access channel's signal superposition feature, can be utilized to reduce the communication loads of the network [3]-[5].

However, the multipath channel, the power misalignment, and the time-synchronization errors in a practical network complicate the design of a reliable OAC scheme. Furthermore, the state-of-the-art OAC schemes often rely on the channel state information (CSI) being available at the ED and ES, which increases the complexity of the design. Also, several communication aspects such as spectral leakage and peak-to-mean envelope power ratio (PMEPR), and power amplifier (PA) efficiency also need to be taken into account. In this present disclosure, we propose an OAC approach to overcome these concerns through circularly-shifted chirp (CSC).

In the literature, OAC for FEEL is studied in several notable studies. In [6], an analog aggregation framework is proposed where the models parameters are transmitted over orthogonal frequency division multiplexing (OFDM) subcarriers, and aggregated over-the-air. To overcome the impact of multipath fading on the aggregation, truncated-channel inversion (TCI) is utilized, where the symbols on the OFDM subcarriers are multiplied by the inverse of the channel coefficients and fading subcarriers are avoided. In [7], one-bit broadband digital aggregation (OBDA) is introduced. In this approach, the signs of the gradients are mapped to the quadrature phase-shift keying (QPSK) symbols and transmitted along with TCI. However, TCI requires that accurate CSIs be available to the EDs and ES, which can cause a non-negligible overhead and requires precise time-synchronization at the ES and EDs as CSI is a function of the synchronization point. The authors of [8] consider that the ES is equipped with multiple antennas and the CSI is not available to the EDs. However, the ES is assumed to have the CSIs of all the channels for beamforming.

In [9], an OAC scheme based on sign stochastic gradient descend (signSGD) [10] with majority vote (MV) is proposed. This method does not rely on the CSIs at the ES and EDs since it calculates the MV with a non-coherent energy accumulation over the orthogonal resources. Therefore, it is immune to the time-synchronization errors. Nevertheless, like other OFDM systems, it can cause a high PMEPR. The MV scheme in [11] maps the signs of the gradients to pulse-position modulation (PPM) symbols constructed with discrete Fourier transform (DFT)-spread OFDM (DFT-s-OFDM), allowing for a spectral efficiency and PMEPR trade-off. However, there is room for improvement in PMEPR, as we show in this present disclosure, by exploiting the excellent temporal characteristics of chirps.

In this presently-disclosed subject matter, we investigate on an OAC approach based on non-coherent detection to achieve long range FEEL. We leverage the fact that CSCs inherently provide low PMEPR [12]. We propose CSCs to indicate the signs of local stochastic gradients, as inspired by the MV with signSGD [10]. Our presently disclosed technique requires considerably less output-power backoff (OBO) than OBDA under an adjacent-channel-leakage ratio (ACLR) constraint, resulting in a better PA efficiency. A reduced OBO also means that the power control can work over a longer distance, resulting in increased cell coverage, needed for FEEL with many low-complexity devices.

Notation: The sets of complex numbers and real numbers are denoted by $\mathbb{C}$ and $\mathbb{R}$, respectively. The function sign(·) results in 1 and −1 for a positive and a negative argument, respectively. The N-dimensional all zero and one vectors are $O_N$ and $I_N$, respectively. $\mathbb{1}[\cdot]$ denotes the indicator function. $\sim C N(\mu, \sigma n^2)$ denotes the complex normal distribution with mean $\mu$ and variance $\sigma n^2$.

SUMMARY OF THE PRESENTLY DISCLOSED SUBJECT MATTER

The presently disclosed scheme utilizes low PMEPR circularly-shifted chirps to transmit gradient information. This makes the scheme suitable for long-range (LoRa) applications. Also, the scheme does not rely on the availability of the CSI to operate.

We propose circularly-shifted chirp (CSC)-based majority vote (MV) (CSC-MV), a low-peak-to-mean envelope power ratio (PMEPR) over-the-air computation (OAC) scheme, to achieve long-range federated edge learning (FEEL).

This presently-disclosed subject matter reduces the communication latency of training an artificial intelligence model over a wireless network with a low PMEPR over-the-air computation scheme. The presently disclosed subject matter allows for a wider cell coverage due to the low PMEPR. Another advantage is that the presently-disclosed subject matter does not use the channel information (e.g., channel frequency response) needed for wireless communications at the edge devices or edge servers.

One presently disclosed exemplary embodiment relates to a low-peak-to-mean envelope power ratio (PMEPR) over-the-air computation (OAC) methodology for long-range federated edge learning (FEEL) without using channel state information (CSI) at a plurality of edge devices (EDs) or at an edge server (ES). Such exemplary methodology preferably comprises a distributed machine-learning model to be trained with the update vectors received at an edge server (ES) as transmitted from a plurality of edge devices (EDs); one or more processors; and one or more non-transitory computer-readable media that store instructions that, when executed by the one or more processors, cause the one or more processors to perform operations. Such operations preferably comprise transmitting local update vector as votes in the form of circularly-shifted chirps based on the sign of the vector's elements, from each respective of the plurality of edge devices (EDs) via a wireless multiple access channel, receiving the superposed local updates at the ES, detecting the majority vote (MV) for each element of the update vector at the ES with a circularly-shifted chirp (CSC)-based energy detector, and inputting the MVs into the machine-learning model for the model parameters to be updated.

Other example aspects of the present disclosure are directed to systems, apparatus, tangible, non-transitory computer-readable media, user interfaces, memory devices, and electronic devices for ultrafast photovoltaic spectroscopy. To implement methodology and technology herewith, one or more processors may be provided, programmed to perform the steps and functions as called for by the presently disclosed subject matter, as will be understood by those of ordinary skill in the art.

Another exemplary embodiment of presently disclosed subject matter relates to a low-peak-to-mean envelope power ratio (PMEPR) over-the-air computation (OAC) system for long-range federated edge learning (FEEL) without using channel state information (CSI) at a plurality of edge devices (EDs) or at an edge server (ES). Such system preferably comprises a machine-learning model training to process update vectors received at an edge server (ES) as transmitted from a plurality of edge devices (EDs); one or more processors; and one or more non-transitory computer-readable media that store instructions that, when executed by the one or more processors, cause the one or more processors to perform operations. Such operations preferably comprise transmitting local update vector as votes in the form of circularly-shifted chirps based on the sign of the vector's elements, from each respective of the plurality of edge devices (EDs) via a wireless multiple access channel, receiving the superposed local updates at the ES, detecting the majority vote (MV) for each element of the update vector at the ES with a circularly-shifted chirp (CSC)-based energy detector, and inputting the MVs into the machine-learning model for the model parameters to be updated.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments, uses, and practices of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification, and will appreciate that the presently disclosed subject matter applies equally to corresponding methodologies as associated with practice of any of the present exemplary devices, and vice versa.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Figure 1:
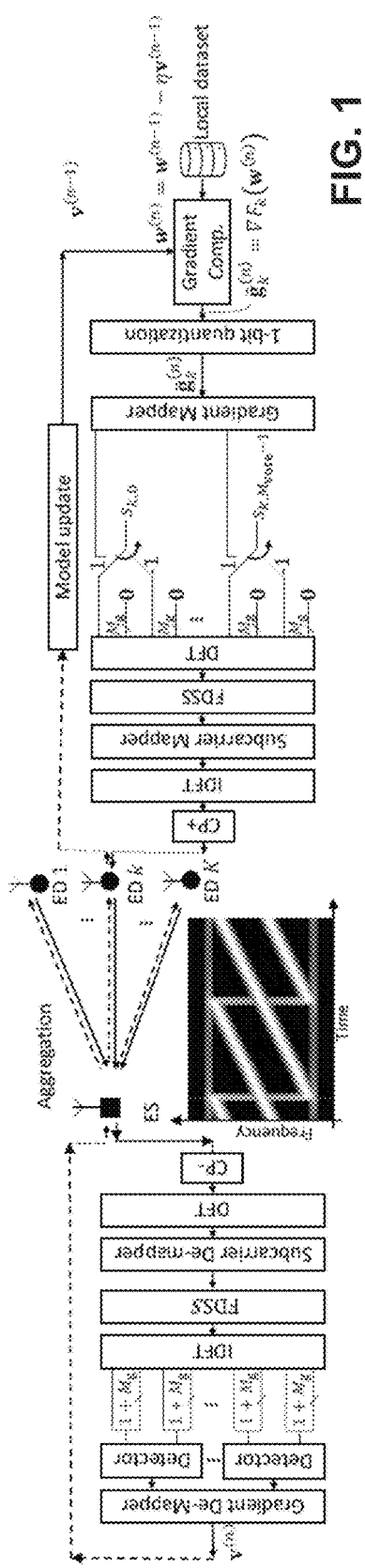
FIG. 1 shows a schematic illustration of an exemplary embodiment of a presently disclosed federated edge learning (FEEL) configuration with circularly-shifted chirp (CSC)-based majority vote (MV) (CSC-MV) technology.

Repeat use of reference characters in the present specification and drawings is intended to represent the same or analogous features or elements of the presently-disclosed subject matter.

DETAILED DESCRIPTION OF THE PRESENTLY DISCLOSED SUBJECT MATTER

It is to be understood by one of ordinary skill in the art that the present disclosure is a description of exemplary embodiments only, and is not intended as limiting the broader aspects of the disclosed subject matter. Each example is provided by way of explanation of the presently disclosed subject matter, not limitation of the presently disclosed subject matter. In fact, it will be apparent to those skilled in the art that various modifications and variations can be made in the presently disclosed subject matter without departing from the scope or spirit of the presently disclosed subject matter. For instance, features illustrated or described as part of one embodiment can be used with another embodiment to yield a still further embodiment. Thus, it is intended that the presently disclosed subject matter covers such modifications and variations as come within the scope of the appended claims and their equivalents.

The presently disclosed scheme utilizes low PMEPR circularly-shifted chirps to transmit gradient information. This makes the scheme suitable for long-range (LoRa) applications. Also, the scheme does not rely on the availability of the CSI to operate.

This presently-disclosed subject matter reduces the communication latency of training an artificial intelligence model over a wireless network with a low PMEPR over-the-air computation scheme. The presently disclosed subject matter allows for a wider cell coverage due to the low PMEPR. Another advantage is that the presently-disclosed subject matter does not use the channel information (e.g., channel frequency response) needed for wireless communications at the edge devices or edge servers.

Existing methods often consider traditional communication systems and do not use over-the-air computing technologies. From the aspect of wireless communication, we are not aware of the product yet. Mostly, likely it will be a case for 5G New Radio and beyond, or 6G. In the literature, broadband analog aggregation (BAA) and OBDA are two major methods that reduce latency. However, both of these schemes suffer from PMEPR issues and are unreliable for long-range applications. Also, they require channel state information at the edge devices (this is a non-negligible overhead).

The market size is large as it is related to both commercial wireless and AI technologies. It could be useful for artificial intelligence technologies over wireless or sensor networks, 5G and beyond, 6G wireless standardization, IEEE 802.11 Wi-Fi.

We propose circularly-shifted chirp (CSC)-based majority vote (MV) (CSC-MV), a low-peak-to-mean envelope power ratio (PMEPR) over-the-air computation (OAC) scheme, to achieve long-range federated edge learning (FEEL). The presently disclosed OAC approach maps the votes from the edge devices (EDs) (i.e., the sign of the local gradients) to f linear CSCs constructed with the discrete Fourier transform (DFT)-spread orthogonal frequency division multiplexing (OFDM) (DFT-s-OFDM). At the edge server (ES), the aggregated MV was calculated non-coherently with an energy detector. Simulations demonstrate that our presently disclosed scheme can achieve significantly low-PMEPR. We compare our presently disclosed scheme with one-bit broadband digital aggregation (OBDA) and show that the output-power back-off (OBO) requirement of the transmitters with an adjacent-channel-leakage ratio (ACLR) constraint for the presently disclosed scheme is significantly lower than the one with OBDA. We demonstrate that CSC-MV outperforms OBDA in terms of test accuracy for both homogeneous and heterogeneous data distributions, even when the power control is not ideal.

FEEL deploys federated learning (FL) over a wireless network, in which many EDs participate in training using locally accessible data and an ES aggregates the local decisions without accessing the data at the EDs. With FEEL, the communication load can be a challenge as a significant number of model parameters/gradients/updates need to be exchanged between the ES and the EDs over the wireless channel. The conventional orthogonal multiple access techniques require more spectral resources as the number of EDs grows. Hence, the spectral congestion problem limits the scalability of FEEL. OAC, which takes advantage of the wireless multiple access channel's signal superposition feature, can be utilized to reduce the communication loads of the network. However, the multipath channel, the power misalignment, and the time-synchronization errors in a practical network complicate the design of a reliable OAC scheme. Furthermore, the state-of-the-art OAC schemes often rely on the channel state information (CSI) being available at the ED and ES, which increases the complexity of the design. Also, several communication aspects such as spectral leakage and PMEPR, and power amplifier (PA) efficiency also need to be considered. We propose an OAC approach to overcome these concerns through CSC.

II. System Model

A. Deployment

We consider a circular cell of radius $R_{max}$ meters with an ES at its center. We assume that all the EDs are deployed uniformly at a radial distance from $R_{min}$ meters to $R_{max}$ meters from the ES. All EDs and ESs are equipped with a single antenna. We consider time-synchronization errors while the frequency synchronization is assumed to be perfect.

In this present disclosure, we consider a power control mechanism that considers the maximum transmit power constraint at the EDs. To model this, let $1/\sigma n^2$ be the signal-to-noise ratio (SNR) of an ED at the ES location when the corresponding link distance is $R_{ref}$ meters. We then express the received signal power of the kth ED located at the distance $r_k$ away from the ES as $$P_{r_k} = \begin{cases} \left(\frac{r_k}{R_{ref}}\right)^{-\alpha+\beta}, & 0 \leq r_k < r_P \\ \left(\frac{r_P}{R_{ref}}\right)^{-\alpha+\beta}, & r_k \geq r_P \end{cases} \quad (1)$$

where $\alpha$ is the path loss exponent of the corresponding channel, $\beta \in [0, \alpha]$ is a coefficient that determines how much path loss is compensated, and $r_P > R_{ref}$ is the threshold distance beyond which the EDs are unable to attain the desired SNR at the ES.

To determine $r_P$, we consider the impact of PA non-linearity on the transmitted signals from EDs and set an ACLR constraint as follows: Let $OBO_0$ be the OBO for the link distance $R_{ref}$ to achieve the desired SNR. Also, let $OBO_{min}$ be the minimum OBO (i.e., results in maximum spectral tolerable growth) that fulfills the ACLR constraint. The path loss compensation can be maintained perfectly (i.e., $\beta=\alpha$) up to a range of $r_P$. Thus, $P_{r_k}=1$ for $0 \leq r_k < r_P$. The transmitted signal power of the ED located at $r_k$ is $(r_k/R_{ref})\beta$ for $0 \leq r_k < r_P$. Let $P_{max}$ be the maximum power output of the PA. Then, $OBO_0=10 \log_{10}(P_{max})$ and $OBO_{min}=10 \log_{10}$ $$\left(P_{max}\left(\frac{R_{ref}}{r_k}\right)^\beta\right),$$

we then calculate $r_P$ as $$r_P = R_{ref} \times 10^{\frac{OBO_0 - OBO_{min}}{10\beta}}. \quad (2)$$

Therefore, for a signal with a lower PMEPR, $OBO_{min}$ is a smaller value and a larger coverage is obtained. In this present disclosure, we use Rapp model for the PA at the EDs with the saturation amplitude of 1 and the smoothness factor of 3.

B. Signal Model: Circularly-Shifted Chirps

As mentioned, PPM-based MV (PPM-MV) is proposed in [11], which utilizes the PPM symbols synthesized with DFT-s-OFDM for transmitting the votes, i.e., the signs of the local gradients. In this presently-disclosed subject matter, we utilize the DFT-s-OFDM block to carry the gradient information with chirps by using the method introduced in [12]. In [12] it is shown that a chirp signal can be synthesized through DFT-s-OFDM with a special choice of frequency-domain spectral shaping (FDSS) coefficients with the motivation of its compatibility to 3GPP 4G LTE and 5G NR. In this present disclosure, we adopt this approach and the EDs access the spectrum with the CSCs synthesized through with DFT-s-OFDM, simultaneously, given by $$t_{k,m} = F_N^H M_f \mathrm{diag}\{f\} D_M d_{k,m}^{(n)}, \quad (3)$$

where $t_{k,m} \in \mathbb{C}^N$ is the mth transmitted baseband signal in discrete time for the kth ED, $F_N^H \in \mathbb{C}^{N \times N}$ is the orthonormal N-point inverse DFT (IDFT) matrix, $D_M \in \mathbb{C}^{M \times M}$ is the orthonormal M-point DFT matrix, $M_f \in \mathbb{R}^{N \times M}$ is the mapping matrix that maps the output of the DFT precoder to a set of contiguous subcarriers, $f \in \mathbb{C}^M$ is the FDSS vector to synthesize chirps, and $d_{k,m}^{(n)} \in \mathbb{C}^M$ contains the symbols on M bins.

In [13], it is shown that $t_{k,m}$ is a linear combination of linear CSCs where the amount of frequency sweep for each CSC is $D/T_{chirp}$ for symbol duration $T_{chirp}$ if the vector f is expressed as $$f = \left[ c_{L_d}, \ldots, i_{L_o}^T \times \sqrt{M / \sum_{j=L_d}^{L_o} |c_j|^2} \right],$$

where $c_j$ is given by $$c_j = \gamma_j (C(\alpha_j) + C(\beta_j) + jS(\alpha_j) + jS(\beta_j)). \quad 4$$

$C(\cdot)$ and $S(\cdot)$ are the Fresnel integrals with cosine and sine functions, respectively, $$\alpha j = (D/2 + 2\pi j)/\sqrt{\pi D},$$

$$\beta_j = (D/2 - 2\pi j)/\sqrt{\pi D}, \gamma_j = \sqrt{\frac{\pi}{D}} e^{-j\frac{(2\pi j)^2}{2D} - j\pi j}$$

for $j \in \{L_d, \ldots, L_u\}$, $L_d \leq -D/2$, $L_u \geq D/2$, and $L_u - L_d + 1 = M$. The spectrogram of a linear combination of two linear CSCs is depicted in FIG. 1.

The cyclic prefix (CP) duration is assumed to be larger than the maximum-excess delays of the channels between the EDs and ES. Thus, the mth received baseband signal in discrete-time can be written as $$r_m = \sum_{k=0}^{K-1} H_k t_{k,m} + n_m. \quad (5)$$

where $H_k \in \mathbb{C}^{N \times N}$ is a circular-convolution matrix based on the DFT of the channel impulse response (CIR) of the channels between EDs and ES, and $n_m \sim \mathcal{CN}(0_N, \sigma_n^2 I_N)$ is the additive white Gaussian noise (AWGN).

At the ES, the aggregated symbols on the bins can be expressed as $$\tilde{d}_m = D_M^H M_f^H \mathrm{diag}\{f^H\} F_N r_m, \quad (6)$$

where $\tilde{d}_m \in \mathbb{C}^M$ are the received symbols on the bins.

C. Learning Model

Let $\mathcal{D}$ be the dataset containing all the labeled data samples. Also, let the vectors x and y be a data sample and its associated label, respectively for $\{(x, y)\} \in \mathcal{D}$. Let $\mathcal{D}_k$ denote the local dataset for user index, $k=0, 1, \ldots, K-1$ such that $\mathcal{D} = \cup_{k=1}^{K} \mathcal{D}_k$. The centralized loss function can be expressed as $$F(w) = \frac{1}{|\mathcal{D}|} \sum_{\forall(x,y) \in \mathcal{D}} f(w, x, y) \quad (7)$$

$$= \sum_{k=1}^{K} \frac{1}{|\mathcal{D}_k|} \sum_{\forall(x,y) \in \mathcal{D}_k} f(w, x, y) = \frac{1}{K} \sum_{k=1}^{K} F_k(w). \quad (8)$$

where $w = [w1, \ldots, w_q]^T \in \mathbb{R}^q$ is the parameter vector, f (w, x, y) denotes the sample loss function that measures the labeling error for (x, y).

In the case of distributed learning, the goal is to minimize the loss function in (8), where the dataset are not uploaded to a centralized server.

Let $\tilde{g}(n)k$ be the local stochastic gradient vector given by $$\tilde{g}_k^{(n)} = \nabla F_k(w^{(n)}) = \frac{1}{n_b} \sum_{\forall(x,y) \in \tilde{\mathcal{D}}_k} \nabla f(w^{(n)}, x, y), \quad (9)$$

where $\tilde{\mathcal{D}}_k \subset \mathcal{D}_k$ ~Dk⊂Dk is the set of the selected data samples and $n_b = |\tilde{\mathcal{D}}_k|$ is the batch size, $w^{(n)}$ is the parameter vector at the nth communication round.

The ith element of $\tilde{g}_k^{(n)}$ is denoted by $\tilde{g}_{k,i}^{(n)}$, which represents the local gradient for parameter $w_i$ for the kth ED. Instead of communicating the true values of $\tilde{g}_{k,i}^{(n)}$, the signs of the gradients, $\bar{g}_{k,i}^{(n)} = \mathrm{sign}(\tilde{g}_{k,i}^{(n)})$ are used to reduce the communication cost [10]. Provided that the local votes are available to the ES, the MV for the ith gradient at the MV v(n) i can be calculated as $$v_i^{(n)} \triangleq \mathrm{sign}\left( \sum_{k=1}^{K} \mathrm{sign}(\tilde{g}_{k,i}^{(n)}) \right) = \mathrm{sign}\left( \sum_{k=1}^{K} \bar{g}_{k,i}^{(n)} \right). \quad (10)$$

After calculating the MVs, $\forall i$, the ES sends the MV vector $v^{(n)} = [v_1^{(n)}, \ldots, v_q^{(n)}]^T$ to the EDs. The updated parameters at the nth communication round can be expressed as $$w^{(n+1)} = w^{(n)} - \eta v^{(n)}, \quad (11)$$

where $\eta$ is the learning rate.

For FEEL, we consider the same procedure outline above. However, we calculate the MV in (10) with an OAC scheme that relies on the non-coherent detection of CSCs.

III. CSC-Based Majority Vote

A. Transmitter

In this present disclosure, we consider the mapping rule defined for the PPM-MV scheme in [11] as our scheme is compatible with DFT-s-OFDM. For the ith gradient, two active indices are assigned. We also consider deactivating $M_g$ indices followed by any active index to provide a guard period in the time domain between adjacent CSCs. The maximum number of votes that can be carried for each OFDM symbol is then $$M_{vote} = \left\lfloor \frac{M}{2(1+M_g)} \right\rfloor.$$

A pre-defined function, $f$, maps $i \in \{1, 2, \ldots, q\}$ to the distinct pairs $(m^+, l^+)$ and $(m^-, l^-)$ that indicate the chirp positions for $m^+, m^- \in \{0, 1, \ldots, S-1\}$ and $l^+, l^- \in \{0, 1, \ldots, 2M_{vote}-1\}$, where S is the total number of symbols needed to train the model for each round. Let $(d_{k,m}^{(n)})_j$ be the symbol at the jth bin of the mth symbol. For all i, we set the following bins of the symbols as $$(d_{k,m_+}^{(n)})_{l^+(1+M_g)} = s_{k,i} \mathbb{I}\,[\tilde{g}_{k,i}^{(n)} = 1],$$

$$(d_{k,m_-}^{(n)})_{l^-(1+M_g)} = s_{k,i} \mathbb{I}\,[\tilde{g}_{k,i}^{(n)} = 1],$$

where $s_{k,i}$ is a random symbol on the unit-circle to introduce random phase.

B. Receiver

It is assumed that the mapping function $f$ is known to the ES so that the ES can calculate the pairs $(m^+, l^+)$ and $(m^-, l^-)$ for a given i. The MV for the ith gradient can then be obtained as $$v_i^{(n)} = \mathrm{sign}(\Delta_i^{(n)}), \qquad (12)$$

where $\Delta_i^{(n)} \triangleq r_i^+ - r_i^-$ for $r_i^+ \triangleq \sum_{j=l^+(1+M_g)}^{(l^++M_g)-1}|(\tilde{d}_{m_+})_j|^2$ and $r_i^- \triangleq \sum_{j=l^-(1+M_g)}^{(l^-+1)(1+M_g)-1}|(\tilde{d}_{m_-})_j|^2$.

Due to the delay spread and the synchronization errors, the position of the chirps in the time domain can be changed at the receiver side. To tackle the problem, we consider $(1+M_g)$ bins for the energy calculations for $r_i^+$ and $r_i^-$. The transmitter and the receiver block diagrams are provided in FIG. 1. The MV obtained from (12) obtains the original MV given in (10), probabilistically.

For a non-convex loss function $F(w)$, based on the assumptions stated in [11], we can show that the presently disclosed scheme maintains the convergence of the original MV in [10] under the assumptions given as follows:

Assumption 1 (Bounded loss function). $\forall w, \exists F^*$ such that $F(w) \geq F^*$.

Assumption 2 (Smooth). Let g be the gradient of $F(w)$ evaluated at w. For all w and w', the expression given by $$|F(w') - (F(w) + g^T(w'-w))| \leq \frac{1}{2}\sum_{i=1}^{q} L_i(w_i' - w_i)^2,$$

holds for some vector with non-negative constant values, $L = [L_1, \ldots, L_q]^T$.

Assumption 3 (Variance bound). The local estimates of the stochastic gradient, $\{\tilde{g}_k = [\tilde{g}_{k,1}, \ldots, \tilde{g}_{k,q}]^T = \nabla F_k(w^{(n)})\}$, $\forall k$, are independent and unbiased estimates of $g = [g_1, \ldots, g_q]^T = \nabla F(w)$ with a coordinate bounded variance, i.e., $\mathbb{E}[\tilde{g}_k] = g$, $\forall k$ and $\mathbb{E}[(\tilde{g}_{k,i} - g_i)^2] \leq \sigma_i^2/n_b$, $\forall k, i$, where $\sigma = [\sigma_1, \ldots, \sigma_q]^T$ is a non-negative constant vector.

Assumption 4 (Unimodal, symmetric gradient noise). For a given w, each element of the vector $\tilde{g}_k$, $\forall k$, follows a unimodal distribution that is symmetric around its mean.

In addition to the above assumptions, we assume that CSCs are orthogonal to each other. This assumption is not strong because the interference among them can be maintained negligibly low if the CSCs are sufficiently separated apart in time from each other. Hence, by using the steps mentioned in [11], based on the specified assumptions, the following theorem can be derived:

Theorem 1. For $n_b = N/\gamma$ and $\eta = \sqrt{\|L\|_1 n_b}$, the convergence rate of CSC-MV based FEEL in fading channel can be expressed as, $$\mathbb{E}\left[\frac{1}{N}\sum_{n=0}^{N-1}\|g^{(n)}\|_1\right] \leq \frac{1}{\sqrt{N}}\left(a\sqrt{\|L\|_1}\left(F(w^{(0)}) - F^* + \frac{\gamma}{2}\right) + \frac{2\sqrt{2\gamma}}{3}\|\sigma\|_1\right), \qquad (13)$$

where $a = \left(1 + \frac{2}{\xi K}\right)\frac{1}{\sqrt{\gamma}}$ for $\xi \triangleq \frac{E_s}{(1+M_g)\sigma_n^2}$.

C. Trade-Offs and Comparisons

The most significant advantage of our presently disclosed approach over the methods proposed in [6]-[8] is that CSC-MV can achieve very low PMEPR resulting in wider cell coverage. In addition, our presently disclosed scheme does not rely on the CSI to function. Non-coherent detection also aids in the elimination of synchronization issues. On the other hand, the presently disclosed scheme causes a trade-off between PMEPR and resource consumption. The PMEPR increases with the number of chirps [14]. Hence, for $M_{vote}$ votes, the PMEPR is $10 \log_{10} M_{vote}$. However, the number of symbols needed to train each round is $\lceil q/M_{vote} \rceil$. As a result, we must increase the PMEPR limit to reduce resource utilization.

IV. Numerical Results

We consider the learning task of handwritten digit recognition over a FEEL system in a circular cell with a radius of $R^{max} = 50$ m and number of EDs, K=50. The path loss exponent is $\alpha = 4$. We assume perfect power control within the coverage range (i.e., $r_k \leq r_P$) and $OBO_0$ is set to 30 dB, and $R_{ref} = R_{min} = 10$ m. We compare the performance of our presently disclosed scheme with OBDA in this setup for both homogeneous and heterogeneous data distributions. For homogeneous data distribution, all digits are equally assigned to each ED. For heterogeneous data distributions, the cell is divided into two equal areas with equal number of EDs. The first area is the circle with a radius of $R_{max}/\sqrt{2}$. The second area is the ring-shaped area enclosed by two concentric circles with radius $R_{max}/\sqrt{2}$ and $R_{max}$. The EDs located at the first and the second area only have the data samples with labels {0, 1, 2, 3, 4} and {5, 6, 7, 8, 9}, respectively.

Our model is based on the convolution neural network (CNN) given in [9], which contains q=123090 learnable parameters. We considered M=54 subcarriers and IDFT size N is set to 64. The FEEL performance is tested under two different uplink SNRs, i.e., 0 dB and 20 dB. ITU Extended Pedestrian A (EPA) is considered for the fading channel with no mobility for each round and the channel variation is considered by regenerating the channel at each communication round. The root-mean-square (RMS) delay spread of the EPA channel is $T_{rms}$=43.1 ns. For each round, we are transmitting 61545 and 30773 symbols for $M_{vote}$=2 and $M_{vote}$=4, respectively.

Figure 2:
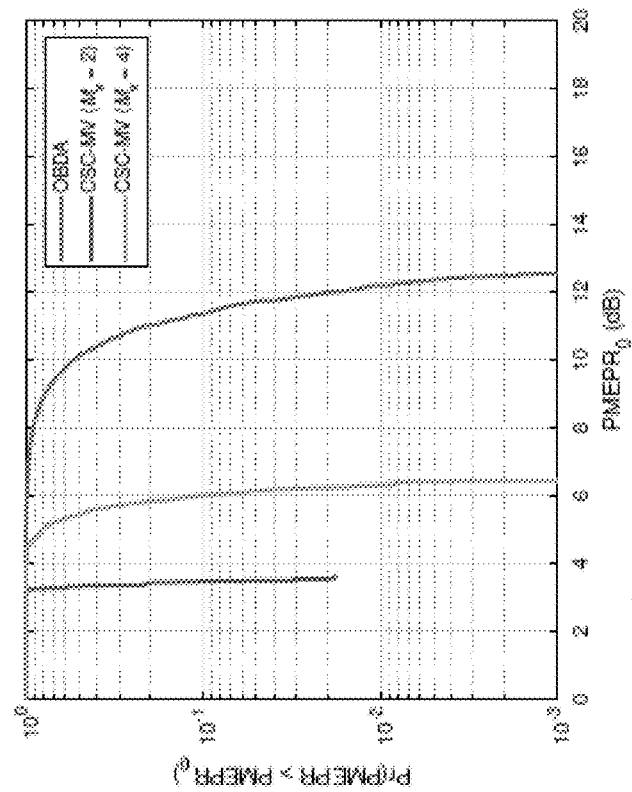
FIG. 2 graphically illustrates peak-to-mean envelope power ratio (PMEPR) distributions of one-bit broadband digital aggregation (OBDA) embodiments versus various embodiments of CSC-MV technology.

In FIG. 2, the PMEPR distributions are compared. The OBDA can cause substantially high PMEPR as the signs of the gradients may result in a constructive addition in the time domain. On the other hand, the chirps results in low PMEPR for both $M_{vote}$=2 and $M_{vote}$=4. As indicated in III-C, the PMEPR is 3 dB for $M_{vote}$=2 and 6 dB for $M_{vote}$=4.

Figure 3:
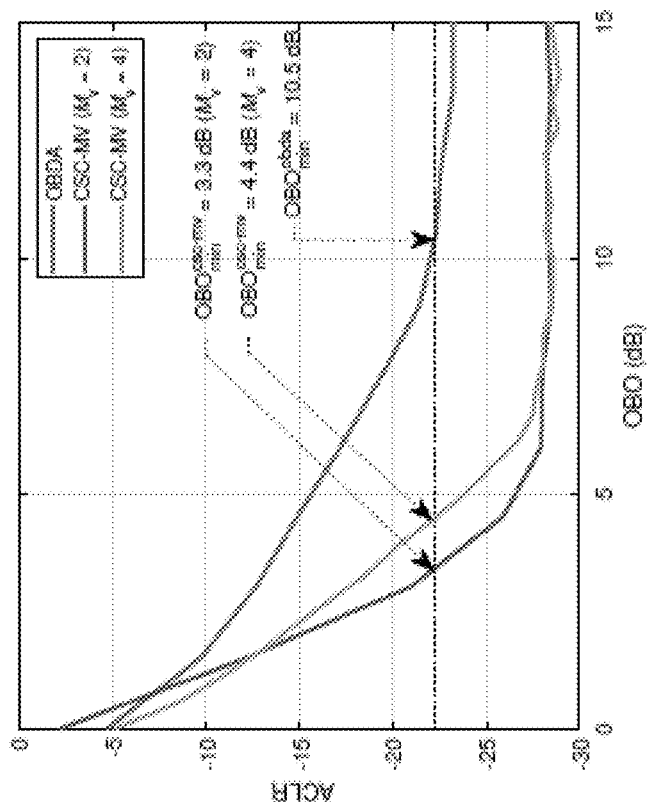
FIG. 3 graphically illustrates adjacent-channel-leakage ratio (ACLR) versus output-power backoff (OBO) plots for different representative schemes.
Figure 4A:
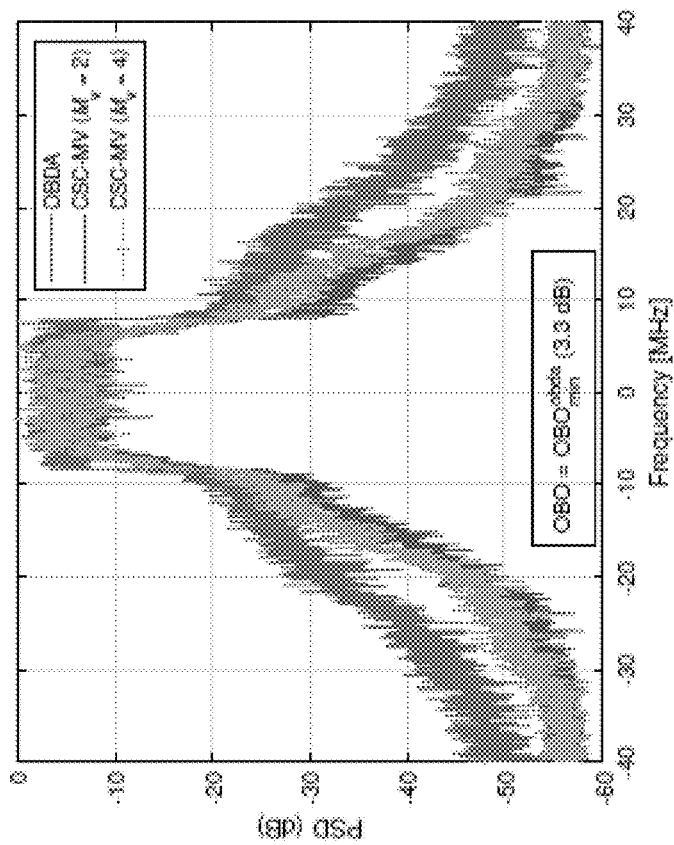
FIGS. 4(a) and 4(b) graphically illustrate out-of-band (OOB) performance of CSC-MV and OBDA at different OBO levels, with FIG. 4(a) representing at 10.5 dB, and FIG. 4(b) representing at 3.3 dB.
Figure 4B:
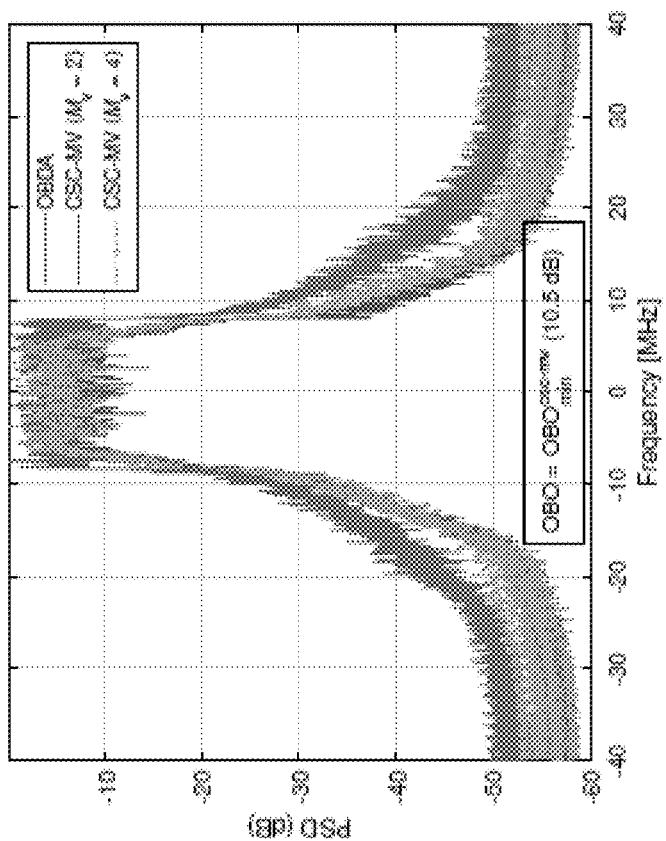
Figure 5:
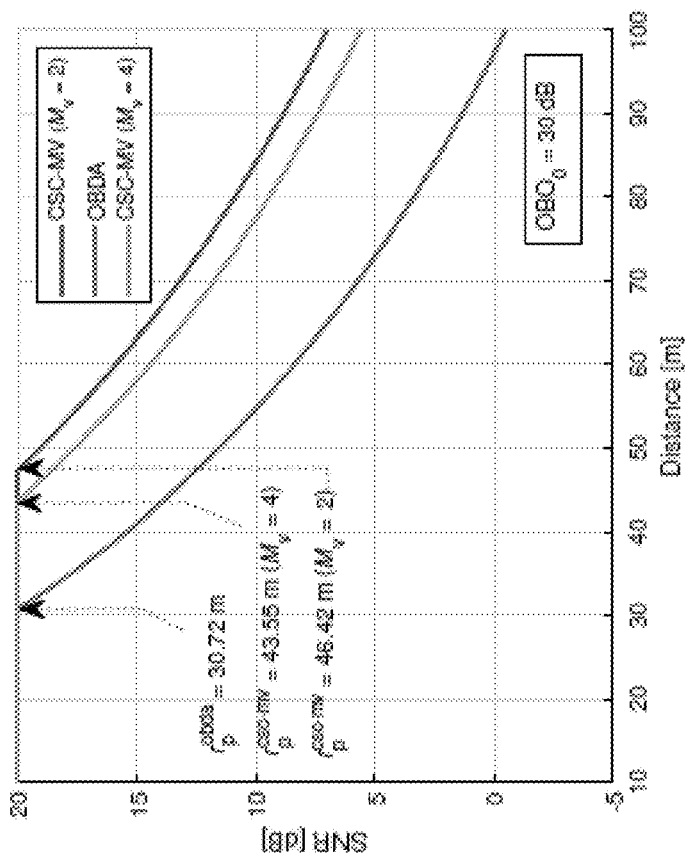
FIG. 5 graphically illustrates signal-to-noise (SNR) ratio versus link distance performance for OBO0=30 dB.

FIG. 3 shows the ACLR versus OBO plots for CSC-MV and OBDA. For both schemes, we consider a time-domain windowing with a raised cosine window to minimize the spectral leakage. We define ACLR as the ratio of the power received outside the allocated frequency band of the channel to the received power on the assigned channel bandwidth. The plots show that under similar ACLR constraints, the power amplifier should operate at a larger OBO value for the OBDA compared to the CSC-MV. Moreover, the lowest ACLR that OBDA and CSC-MV can achieve is −23 dB and −28.22 dB, respectively. If we consider an ACLR constraint of −22 dB, the OBO at the PA should not be less than 3.3 dB, 4.4 dB and 10.5 dB for CSC-MV with $M_{vote}$=2, CSC-MV with $M_{vote}$=4, and OBDA, respectively. Hence, we calculate $OBO_{min}^{obda}$=10.5 dB, $OBO_{min}^{csc-mv}$=3.3 dB for $M_{vote}$=2 and $OBO_{min}^{csc-mv}$=4.4 dB for $M_{vote}$=4 as the minimum OBO values at the PAs for the corresponding schemes. In FIG. 4(a) and FIG. 4(b), the out-of-band (OOB) performance is shown for different schemes at OBO=$OBO_{min}^{csc-mv}$ and OBO=$OBO_{min}^{csc-mv}$, respectively. The plots show that the OBDA is more prone to the spectral leakage problem than CSC-MV. In FIG. 5, the uplink SNR versus link distance performances are shown under the ACLR constraint. The curves indicate that the power control can maintain the uplink SNR up to a range of $r_P$, where the range of power control for OBDA, CSC-MV ($M_{vote}$=2) and CSC-MV ($M_{vote}$=4) are 30.72 m, 43.55 m, and 46.42 m, respectively. Hence, the area of the cell is appropriately doubled with $M_{vote}$=2 as compared to OBDA.

Figure 6:
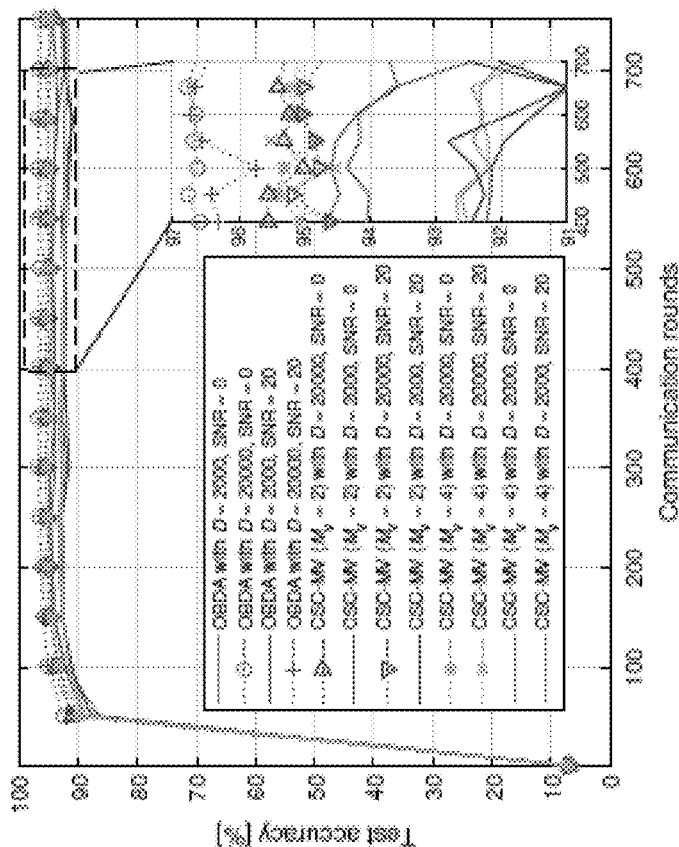
FIG. 6 graphically illustrates test accuracy results for various indicated homogeneous data distributions.

In FIG. 6, the test accuracy results are shown for homogeneous data distribution for SNR={0, 20} dB, K=50, and D={2000, 20000}. Both OBDA and CSC-MV perform with high accuracy in all scenarios. We define all the EDs at R≤$r_P$ as near EDs and the ones at R>$r_P$ as far EDs. For the given setup, the number of near EDs for OBDA, CSC-MV ($M_{vote}$=2) and CSC-MV ($M_{vote}$=4) are 20, 37, and 42, respectively. For OBDA, the votes of the 20 near EDs have a stronger impact compared to the random votes of the 30 far EDs affected by the imperfect power control. In the end, the training is unaffected and the OBDA performs well for homogeneous data distribution.

Figure 7A:
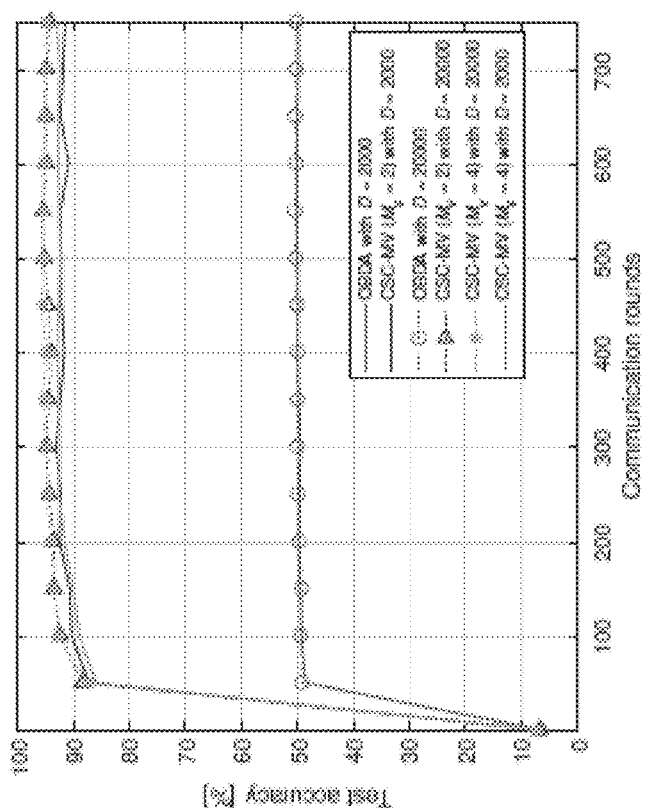
FIGS. 7(a) and 7(b) graphically illustrate average test accuracy results for heterogeneous data distributions (EPA, N=750, K=50) at different SNR levels, with FIG. 7(a) representing SNR is 0 dB and FIG. 7(b) representing SNR is 20 dB.
Figure 7B:
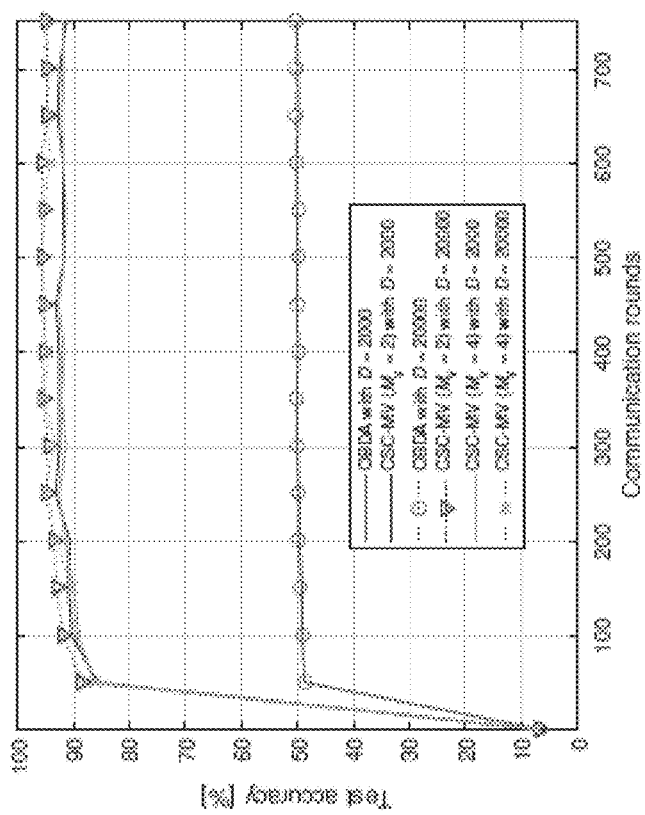
Figure 8A:
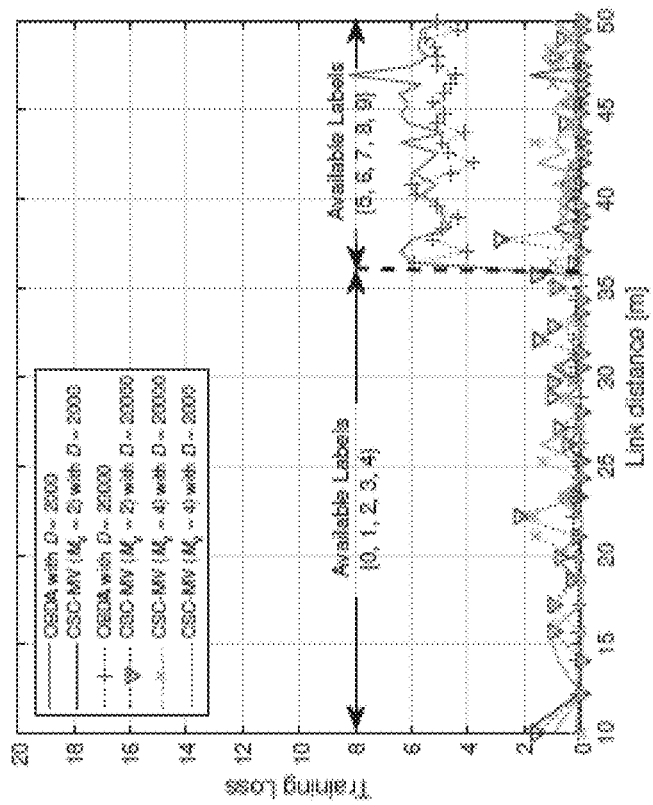
FIGS. 8(a) and 8(b) graphically illustrate training loss versus link distance results for heterogeneous data distributions after 750th communication round (EPA, K=50) at different SNR levels, with FIG. 8(a) representing SNR is 0 dB and FIG. 8(b) representing SNR is 20 dB.
Figure 8B:
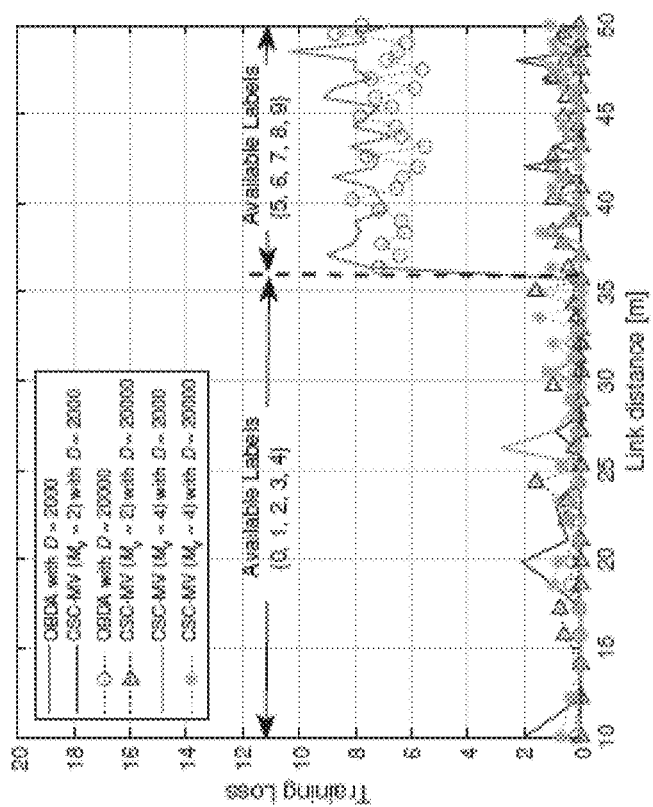

FIG. 7 shows that CSC-MV performs much better than OBDA in terms of test accuracy for heterogeneous data distributions. The test accuracy results can be further understood from the loss vs. link-distance performance after 750 iterations given in FIG. 8. For OBDA, the plot shows that the 20 near EDs only have half of the available labels. As a result, the trained model fails to distinguish the other half of the digits and the test accuracy is near 50%, i.e., the learning is biased towards the nearby EDs due to the smaller cell size caused by the ACLR constraint. For CSC-MV ($M_{vote}$=4), of the 37 near EDs, 25 of them have the dataset with labels {0, 1, 2, 3, 4,}, and the remaining 12 EDs have the dataset with labels {5, 6, 7, 8, 9}. The availability of all the labels allows the model to converge with high test accuracy. For the same reason, the test accuracy is high for CSC-MV ($M_{vote}$=2).

V. Concluding Remarks

In this present disclosure, we propose a CSC-based OAC for FEEL. The main advantage of the presently disclosed scheme is low PMEPR, which results in a larger cell size as compared to OBDA under an ACLR constraint. Also, CSC-MV can work at a much lower OBO level than the one for OBDA. Hence, a better PA efficiency, i.e., crucial for reducing the cost of the low-complexity devices, e.g., sensors, can be obtained for a distributed learning scenario. On the other hand, the main bottleneck of the presently disclosed scheme is that it requires a larger number of symbols as compared to OBDA. We demonstrate that a larger cell size helps to achieve a high test accuracy for heterogeneous data distributions, particularly, when the dataset changes based on the location of the devices. Our numerical results show that, in comparison to OBDA, the presently disclosed scheme leads to a larger area in which ED can converge, resulting in high test accuracy. In future efforts, the presently disclosed concept will be enhanced to decrease the number of symbols transmitted while maintaining the low PMEPR.

This written description uses examples to disclose the presently disclosed subject matter, including the best mode, and also to enable any person skilled in the art to practice the presently disclosed subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural and/or step elements that do not differ from the literal language of the claims, or if they include equivalent structural and/or elements with insubstantial differences from the literal languages of the claims.

REFERENCES

[1] T. Gafni, N. Shlezinger, K. Cohen, Y. C. Eldar, and H. V. Poor, "Federated learning: A signal processing perspective," 2021. [Online]. Available: arXiv:2103.17150

[2] M. Chen, D. Gunduz, K. Huang, W. Saad, M. Bennis, A. V. Feljan, and H. V. Poor, "Distributed learning in wireless networks: Recent progress and future challenges," 2021. [Online]. Available: arXiv:2104.02151

[3] M. Goldenbaum, H. Boche, and S. Sta'nczak, "Harnessing interference for analog function computation in wireless sensor networks," *IEEE Trans. Signal Process.*, vol. 61, no. 20, pp. 4893-4906, October 2013.

[4] W. Liu, X. Zang, Y. Li, and B. Vucetic, "Over-the-air computation systems: Optimization, analysis and scaling laws," *IEEE Trans. Wireless Commun.*, vol. 19, no. 8, pp. 5488-5502, August 2020.

[5] B. Nazer and M. Gastpar, "Computation over multiple-access channels," *IEEE Trans. Inf. Theory*, vol. 53, no. 10, pp. 3498-3516, October 2007.

[6] G. Zhu, Y. Wang, and K. Huang, "Broadband analog aggregation for low-latency federated edge learning," *IEEE Trans. Wireless Commun.*, vol. 19, no. 1, pp. 491-506, January 2020.

[7] G. Zhu, Y. Du, D. Gunduz, and K. Huang, "One-bit over-the-air aggregation for communication-efficient federated edge learning: Design and convergence analysis," *IEEE Trans. Wireless Commun., vol.* 20, no. 3, pp. 2120-2135, November 2021.

[8] M. M. Amiri and D. Gunduz, "Federated learning over wireless fading channels," *IEEE Trans. Wireless Commun.*, vol. 19, no. 5, pp. 3546-3557, February 2020.

[9] A. Sahin, B. Everette, and S. Hoque, "Distributed learning over a wireless network with FSK-based majority vote," in *Proc. IEEE International Conference on*

Advanced Communication Technologies and Networking (*CommNet*), December 2021, pp. 1-9.

[10] J. Bernstein, Y.-X. Wang, K. Azizzadenesheli, and A. Anandkumar, "signSGD: Compressed optimisation for non-convex problems," in *Proc. in International Conference on Machine Learning*, vol. 80. *Proceedings of Machine Learning Research*, 10-15 Jul. 2018, pp. 560-569.

[11] A. Sahin, B. Everette, and S. Hoque, "Over-the-air computation with DFT-spread OFDM for federated edge learning," in *Proc. IEEE Wireless Communications and Networking Conference* (*WCNC*), April 2022, pp. 1-6.

[12] A. Sahin, R. Yang, E. Bala, M. C. Beluri, and R. L. Olesen, "Flexible DFT-S-OFDM: Solutions and challenges," *IEEE Communications Magazine*, vol. 54, no. 11, pp. 106-112, 2016.

[13] A. Sahin, N. Hosseini, H. Jamal, S. S. M. Hoque, and D. W. Matolak, "DFT-Spread-OFDM-based chirp transmission," *IEEE Communications Letters*, vol. 25, no. 3, pp. 902-906, 2021.

[14] S. Hoque, C.-Y. Chen, and A., Sahin, "A wideband index modulation with circularly-shifted chirps," in *Proc. IEEE Consumer Commun. & Netw. Conf.* (*CCNC*), January 2021, pp. 1-6.

What is claimed is:

1. A low peak-to-mean envelope power ratio (PMEPR) over-the-air computation (OAC) methodology for long-range federated edge learning (FEEL) without using channel state information (CSI) at a plurality of edge devices (EDs) or at an edge server (ES), comprising: a distributed machine-learning model to be trained with the update vectors received at the edge server (ES) as transmitted from the plurality of edge devices (EDs); one or more processors; and one or more non-transitory computer-readable media that store instructions that, when executed by the one or more processors, cause the one or more processors to perform operations, the operations comprising: transmitting local update vector as votes in a form of circularly-shifted chirps based on the sign of the local update vector's elements, from each respective of the plurality of edge devices (EDs) via a wireless multiple access channel, receiving the superposed said local updates vectors at the ES, detecting the majority vote (MV) for each element of the local update vector at the ES with a circularly-shifted chirp (CSC)-based energy detector, and inputting the MVs into the machine-learning model for the model parameters to be updated.

2. The methodology according to claim 1, wherein the votes from the EDs include the signs of the local gradients.

3. The methodology according to claim 2, wherein mapping includes mapping the votes to linear CSCs constructed with pulse-position modulation (PPM) symbols constructed with discrete Fourier transform (DFT)-spread orthogonal frequency division multiplexing (OFDM) (DFT-s-OFDM), whereby the DFT-s-OFDM carry the gradient information with chirps.

4. The methodology according to claim 3, wherein at the ES, aggregated MV is calculated non-coherently.

5. The methodology according to claim 3, wherein chirp signals are synthesized through DFT-s-OFDM through the choice of frequency-domain spectral shaping (FDSS) coefficients.

6. The methodology according to claim 3, wherein $t_{k,m}$ comprises a linear combination of linear CSCs where the amount of frequency sweep for each CSC is $D/T_{chirp}$ for symbol duration $T_{chirp}$ where $t_{k,m}$ is the mth transmitted baseband signal in discrete time for the kth ED.

7. The methodology according to claim 3, wherein receiving operations include the ES detecting MV with a non-coherent detector by taking delay spread and synchronization errors into account to eliminate need for truncated-channel inversion (TCI) at the EDs.

8. The methodology according to claim 1, wherein the machine learning model comprises artificial intelligence technology over wireless or sensor networks, 5G or higher, 6G wireless standardization, or IEEE 802.11 Wi-Fi.

9. The methodology according to claim 3, wherein MV for the ith gradient at the MV v(n) i for the kth ED at the nth communication round between at least one ED and the ES comprises:

$$v_i^{(n)} \triangleq \text{sign}\left(\sum_{k=1}^{K} \text{sign}(\tilde{g}_{k,i}^{(n)})\right) = \text{sign}\left(\sum_{k=1}^{K} \tilde{g}_{k,i}^{(n)}\right).$$

10. The methodology according to claim 1, wherein the machine-learning model is training to learn the task of handwritten digit recognition.

11. The methodology according to claim 1, wherein the machine-learning model comprises a convolution neural network with multiple convolutional layers, with each convolutional layer followed by a batch normalization layer and rectified-linear unit (ReLU) activation following each of them.

12. The methodology according to claim 11, wherein the multiple convolutional layers each have a plurality of filters, and a fully connected layer with plural units and a softmax layer are used after one of the ReLU.

13. The methodology according to claim 1, further comprising detector operations at the ES that the detector compares the energies on two adjacent CSCs to determine a gradient vector, with a guard period in the time domain between two adjacent CSCs.

14. A low peak-to-mean envelope power ratio (PMEPR) over-the-air computation (OAC) system for long-range federated edge learning (FEEL) without using channel state information (CSI) at a plurality of edge devices (EDs) or at an edge server (ES), comprising: a machine-learning model training to process update vectors received at the edge server (ES) as transmitted from the plurality of edge devices (EDs); one or more processors; and one or more non-transitory computer-readable media that store instructions that, when executed by the one or more processors, cause the one or more processors to perform operations, the operations comprising: transmitting local update vectors as votes in a form of circularly-shifted chirps based on a sign of the local update vector's elements over selected multiple subcarriers from each respective of the plurality of edge devices (EDs) via a wireless multiple access channel, receiving the superposed said local updates vectors at the ES, mapping the majority vote (MV) for each element of the local update vector at the ES with a circularly-shifted chirp (CSC)-based energy detector, and inputting the MVs into the machine-learning model for the model parameters to be updated, transmitting local update vector as votes in the form of circularly-shifted chirps based on the sign of the vector's elements, from each respective of the plurality of edge devices (EDs) via a wireless multiple access channel, receiving the superposed local updates at the ES, detecting the majority vote (MV) for each element of the update vector at the ES with a circularly-shifted chirp (CSC)-based energy detector, and inputting the MVs into the machine-learning model for the model parameters to be updated.

15. The system according to claim 14, further including transmitters for transmitting the votes over multiple orthogonal subcarriers; and wherein, to determine the majority vote (MV) for each element of the update vector, the one or more processors are further programmed to perform mapping the votes to linear CSCs constructed with pulse-position modulation (PPM) symbols constructed with discrete Fourier transform (DFT)-spread orthogonal frequency division multiplexing (OFDM) (DFT-s-OFDM), whereby the DFT-s-OFDM carry the gradient information with chirps.

16. The system according to claim 14, wherein, to perform receiving operations, the one or more processors are further programmed to include the ES detecting MV with a non-coherent detector by taking delay spread and synchronization errors into account to eliminate need for truncated-channel inversion (TCI) at the EDs.

17. The system according to claim 14, wherein the machine-learning model comprises a convolution neural network with multiple convolutional layers, with each convolutional layer followed by a batch normalization layer and rectified-linear unit (ReLU) activation following each of them.

18. The system according to claim 14, wherein the system is configured to operate over wireless or sensor networks, 5G or higher, 6G wireless standardization, or IEEE 802.11 Wi-Fi.

* * * * *